United States Patent
Stephens et al.

(10) Patent No.: US 8,761,065 B2
(45) Date of Patent: Jun. 24, 2014

(54) TECHNIQUES FOR WAKEUP SIGNALING FOR A VERY LOW POWER WLAN DEVICE

(75) Inventors: Adrian P. Stephens, Cambridge (GB); Eldad Perahia, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 564 days.

(21) Appl. No.: 12/947,215

(22) Filed: Nov. 16, 2010

(65) Prior Publication Data

US 2012/0120859 A1    May 17, 2012

(51) Int. Cl.
*G08C 17/00* (2006.01)
(52) U.S. Cl.
USPC .......................................................... 370/311
(58) Field of Classification Search
None
See application file for complete search history.

(56) References Cited

U.S. PATENT DOCUMENTS

| | | | |
|---|---|---|---|
| 7,453,793 B1 * | 11/2008 | Jones et al. | 370/203 |
| 2004/0077352 A1 * | 4/2004 | Mahany | 455/448 |
| 2007/0153705 A1 * | 7/2007 | Rosar et al. | 370/254 |
| 2007/0211765 A1 * | 9/2007 | Vrcelj et al. | 370/503 |
| 2007/0264963 A1 * | 11/2007 | Srinivasan et al. | 455/343.2 |
| 2008/0013516 A1 * | 1/2008 | Zhang et al. | 370/342 |
| 2008/0130604 A1 * | 6/2008 | Boyd | 370/338 |
| 2008/0219196 A1 * | 9/2008 | Ptasinski | 370/311 |
| 2009/0252135 A1 | 10/2009 | Benveniste | |
| 2009/0279464 A1 * | 11/2009 | Kakani et al. | 370/311 |
| 2009/0310618 A1 * | 12/2009 | Carter | 370/449 |
| 2010/0110955 A1 * | 5/2010 | Wu et al. | 370/311 |
| 2010/0246427 A1 | 9/2010 | Gheorghiu et al. | |
| 2010/0265864 A1 | 10/2010 | He et al. | |
| 2011/0274021 A1 * | 11/2011 | He et al. | 370/311 |

FOREIGN PATENT DOCUMENTS

| | | |
|---|---|---|
| WO | 2012/067884 A2 | 5/2012 |
| WO | 2012/067884 A3 | 7/2012 |

OTHER PUBLICATIONS

Desire Guel et al., OFDM PAPR Reduction Based on Nonlinear Functions without BER Degradation and Out-Of-Band Emission, IEEE 2009 International Conference on Signal Processing Systems. p. 167-p. 171.*
Chiasserini et al., "Combining paging with dynamic power management", IEEE INFOCOM 2001, Apr. 22-26, 2001, See abstract, Sections I, II VIII, Figure 5.
International Search Report and Written Opinion Received for PCT Application No. PCT/US2011/059641, mailed on May 15, 2012, 8 pages.
International Preliminary Report on Patentability Received for PCT Patent Application No. PCT/US2011/059641, mailed on May 30, 2013, 5 pages.

* cited by examiner

*Primary Examiner* — Otis L Thompson, Jr.
(74) *Attorney, Agent, or Firm* — Ellis B. Ramirez; Prass, LLP

(57) ABSTRACT

An embodiment of the present invention provides a method of wakeup signaling for a very low power wireless local area network device (WLAN) device, comprising transmitting by an access point operable in the WLAN of a wake-up signal that can be received using low-power techniques at a receiver associated with the device.

18 Claims, 2 Drawing Sheets

TECHNIQUES FOR WAKEUP SIGNALING FOR A VERY LOW POWER WLAN DEVICE

BACKGROUND

The downlink for very low power wireless local area network (WLAN) devices is problematic. The device needs to wake up according to some internal schedule and determine if the access point (AP) has data for it. In devices that are operable in wireless networks that conform to the Institute for Electronic and Electrical Engineers (IEEE) 802.11 standard, that means either checking for a TIM bit in the beacon, or sending a trigger or poll frame to the AP.

If the device is intended for very low power operation and only very infrequently receives data (e.g. control parameters to a temperature sensor), this waking up process usually discovers there is no data and therefore may waste a great amount of power.

Thus, a critical need is prevalent for techniques for wakeup signaling for a very low power WLAN device.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1:
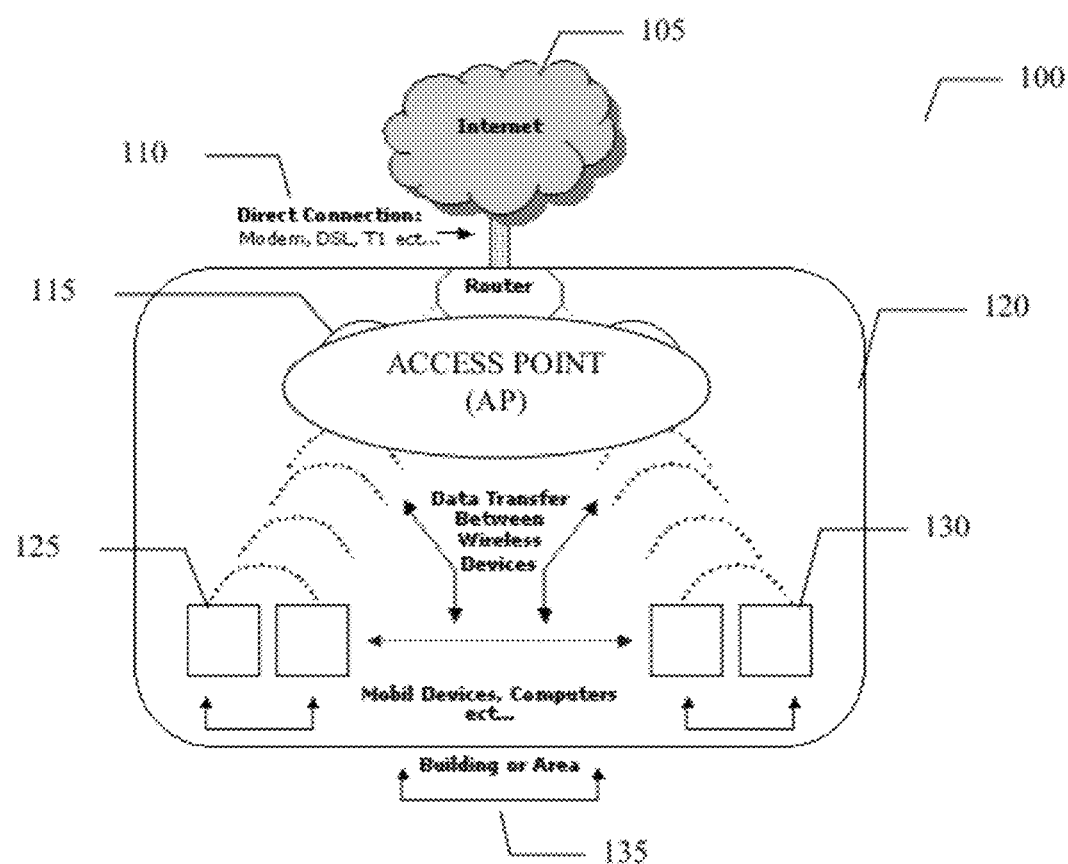
FIG. 1 illustrates a block diagram of an illustrative wireless network according to embodiments of the present invention.

It will be appreciated that for simplicity and clarity of illustration, elements illustrated in the figures have not necessarily been drawn to scale. For example, the dimensions of some of the elements are exaggerated relative to other elements for clarity. Further, where considered appropriate, reference numerals have been repeated among the figures to indicate corresponding or analogous elements.

DETAILED DESCRIPTION

In the following detailed description, numerous specific details are set forth in order to provide a thorough understanding of the invention. However, it will be understood by those skilled in the art that the preset invention may be practiced without these specific details. In other instances, well-known methods, procedures, components and circuits have not been described in detail so as not to obscure the present invention.

Although embodiments of the invention are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

Although embodiments of the invention are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. For example, "a plurality of stations" may include two or more stations.

Embodiments of the present invention provide a method to avoid the need to fully wake up to determine if there is data buffered. The access point (AP) transmits a special wake-up signal that can be received using low-power techniques at the receiver. For example, using a narrowband signal to reduce receiver radio power or using a simple form of modulation that can easily be demodulated using analogue components (e.g. frequency shift keying (FSK), on-off keying).

In embodiments of the present invention the AP can negotiate with a wireless station (STA—which also may be referred to herein as a mobile device or short hand just device) to determine a wake-up frequency per STA. It can then synthesize a wide-band wake-up packet containing multiple narrowband pilots for individual STA (or groups of STAs) using orthogonal frequency division multiplexing (OFDM), although the present invention is not limited in this respect. Unused (unallocated) subcarriers can be filled to maintain spectral flatness.

Alternatively, in an embodiment of the present invention, the wake-up signal could be embedded in the unused subcarriers at the edge of an otherwise normal 802.11a/g OFDM transmission. These subcarriers are used in an 802.11n packet, so the ability to transmit an 802.11a/g packet plus data within these subcarriers should be capable of being added to an 802.11n product. The modified packet should not affect the ability of an 802.11a/g or n receiver to correctly receive the normal contents of the packet provided that the additional subcarriers are present only in the data field portion of the packet.

The client device wakes (according to some schedule agreed with the AP, or published by the AP) partially to receive the pilot, and only needs to wake fully when the pilot indicates that downlink data is available for it.

Turning now to the figures, FIG. 1 at 100 depicts an embodiment of the present invention which provides an apparatus and system, comprising a transceiver or receiver associated with a mobile device (125 or 130), which may be referred to as a wireless station (STA) operable to communicate in a wireless network 140 that may be located in a specific area or building 135. The mobile devices may be in communication with access point 115 with an associated transceiver, which may be connected to the Internet 105 via, for example, a T-1 line or fiber optic line 110. The AP and STAs may be operating as part of the same basic service set (BSS) 120. The transceivers or simply receivers associated with the AP and STA may operate according to the techniques and methods outlined above and described below.

Figure 2:
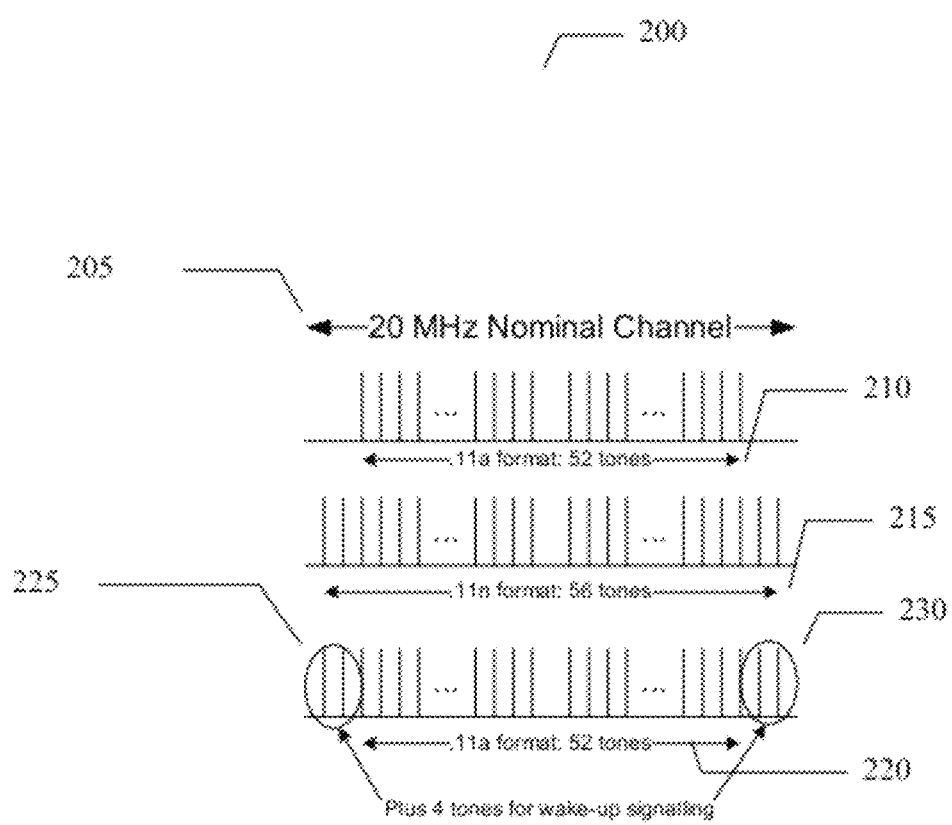
FIG. 2 shows tone allocation for a wake-up packet format according to embodiments of the present invention.

Looking now at FIG. 2, generally as 200, shows tone allocation for a wake-up packet format according to embodiments of the present invention. Shown is a 20 MHz nominal channel 205 of 11a format: 52 tones 210; 11n format: 56 tones 215; 11a format: 52 tones 220 plus four tones for wake-up signaling 225 and 230.

Thus, embodiments of the present invention may provide an apparatus, comprising an access point (AP) operable in a wireless local area network (WLAN) and adapted to provide wakeup signaling for a very low power WLAN device by transmitting a wake-up signal that can be received using low-power techniques to a receiver associated with the device. Further, embodiments of the present invention may provide an apparatus, comprising a mobile device capable of communicating with an access point (AP) and operable in a wireless local area network (WLAN), the AP adapted to provide wakeup signaling for the mobile device by transmitting a wake-up signal that can be received using low-power techniques to a receiver associated with the mobile device.

Further, embodiments of the present invention may provide a computer readable medium encoded with computer executable instructions, which when accessed, cause a machine to perform operations comprising signaling a wakeup for a very low power wireless local area network (WLAN) device by transmitting from an access point operable in the WLAN of a wake-up signal that can be received using low-power techniques at a receiver associated with the device.

While certain features of the invention have been illustrated and described herein, many modifications, substitutions, changes, and equivalents may occur to those skilled in the art. It is, therefore, to be understood that the appended claims are intended to cover all such modifications and changes as fall within the true spirit of the invention.

We claim:

1. A method of wakeup signaling for a very low power wireless local area network (WLAN) device, comprising:
    transmitting by an access point (AP) operable in said WLAN of a wake-up signal that can be received using low-power techniques at a receiver associated with said device;
    wherein said AP is capable of negotiating with devices operating in said WLAN to determine a wake-up frequency per device and wherein said AP can then synthesize a wide-band wake-up packet containing multiple narrowband pilots for an individual device or groups of devices using orthogonal frequency division multiplexing (OFDM) and unused or unallocated subcarriers can be filled to maintain spectral flatness, and
    wherein a wake-up signal is embedded in unused subcarriers at an edge of an otherwise normal OFDM transmission and wherein said subcarriers are used in a WLAN packet and wherein said subcarriers are present only in a data field portion of said WLAN packet.

2. The method of claim 1, wherein said low-power technique comprises using a narrowband signal to reduce receiver radio power.

3. The method of claim 1, wherein said low-power technique comprises using a simple form of modulation by said AP that can easily be demodulated by said receiver using analogue components.

4. The method of claim 3, wherein said device wakes according to a schedule agreed with said AP, or published by said AP partially to receive said pilot, and only needs to wake fully when said pilot indicates that downlink data is available for it.

5. The method of claim 1, wherein said wireless network operates conforming to the Institute for Electronic and Electrical Engineering (IEEE) 802.11 standard.

6. A non-transitory computer readable medium encoded with computer executable instructions, which when accessed, cause a machine to perform operations comprising:
    signaling a wakeup for a very low power wireless local area network (WLAN) device by transmitting from an access point (AP) operable in said WLAN of a wake-up signal that can be received using low-power techniques at a receiver associated with said device;
    wherein said AP is capable of negotiating with devices operating in said WLAN to determine a wake-up frequency per device and wherein said AP can then synthesize a wide-band wake-up packet containing multiple narrowband pilots for an individual device or groups of devices using orthogonal frequency division multiplexing (OFDM) and unused or unallocated subcarriers can be filled to maintain spectral flatness, and
    wherein a wake-up signal is embedded in unused subcarriers at an edge of an otherwise normal OFDM transmission and wherein said subcarriers are used in a WLAN packet and wherein said subcarriers are present only in a data field portion of said WLAN packet.

7. The non-transitory computer readable medium encoded with computer executable instructions of claim 6, wherein said low-power technique comprises using a narrowband signal to reduce receiver radio power.

8. The non-transitory computer readable medium encoded with computer executable instructions of claim 6, wherein said low-power technique comprises using a simple form of modulation by said AP that can easily be demodulated by said receiver using analogue components.

9. The non-transitory computer readable medium encoded with computer executable instructions of claim 8, wherein said device wakes according to a schedule agreed with said AP, or published by said AP partially to receive said pilot, and only needs to wake fully when said pilot indicates that downlink data is available for it.

10. The non-transitory computer readable medium encoded with computer executable instructions of claim 6, wherein said wireless network operates conforming to the Institute for Electronic and Electrical Engineering (IEEE) 802.11 standard.

11. An apparatus, comprising:
    an access point (AP) operable in a wireless local area network (WLAN) and adapted to provide wakeup signaling for a very low power WLAN device by transmitting a wake-up signal that can be received using low-power techniques to a receiver associated with said device;
    wherein said AP is capable of negotiating with devices operating in said WLAN to determine a wake-up frequency per device and wherein said AP can then synthesize a wide-band wake-up packet containing multiple narrowband pilots for an individual device or groups of devices using orthogonal frequency division multiplexing (OFDM) and unused or unallocated subcarriers can be filled to maintain spectral flatness, and
    wherein a wake-up signal is embedded in unused subcarriers at an edge of an otherwise normal OFDM transmission and wherein said subcarriers are used in a WLAN packet and wherein said subcarriers are present only in a data field portion of said WLAN packet.

12. The apparatus of claim 11, wherein said low-power technique comprises using a narrowband signal to reduce receiver radio power.

13. The apparatus of claim 11, wherein said low-power technique comprises using a simple form of modulation by said AP that can easily be demodulated by said receiver using analogue components.

14. The apparatus of claim 13, wherein said device wakes according to a schedule agreed with said AP, or published by said AP partially to receive said pilot, and only needs to wake fully when said pilot indicates that downlink data is available for it.

15. An apparatus, comprising:
    a mobile device capable of communicating with an access point (AP) and operable in a wireless local area network (WLAN), said AP adapted to provide wakeup signaling for said mobile device by transmitting a wake-up signal that can be received using low-power techniques to a receiver associated with said mobile device;

wherein said AP is capable of negotiating with devices operating in said WLAN to determine a wake-up frequency per device and wherein said AP can then synthesize a wide-band wake-up packet containing multiple narrowband pilots for an individual device or groups of devices using orthogonal frequency division multiplexing (OFDM) and unused or unallocated subcarriers can be filled to maintain spectral flatness, and wherein a wake-up signal is embedded in unused subcarriers at an edge of an otherwise normal OFDM transmission and wherein said subcarriers are used in a WLAN packet and wherein said subcarriers are present only in a data field portion of said WLAN packet.

16. The apparatus of claim 15, wherein said low-power technique comprises using a narrowband signal to reduce receiver radio power.

17. The apparatus of claim 15, wherein said low-power technique comprises using a simple form of modulation by said AP that can easily be demodulated by said receiver using analogue components.

18. The apparatus of claim 17, wherein said device wakes according to a schedule agreed with said AP, or published by said AP partially to receive said pilot, and only needs to wake fully when said pilot indicates that downlink data is available for it.

* * * * *